United States Patent [19]
Kim et al.

[11] Patent Number: 5,854,816
[45] Date of Patent: Dec. 29, 1998

[54] LOOP BACK DEVICE OF PACKET COMMUNICATION T1 NETWORK

[75] Inventors: Si-Deog Kim, Seoul; Hyun-Woo Ha, Kyoungki-do, both of Rep. of Korea

[73] Assignee: Hyundai Electronics Ind. Co., Ltd., Rep. of Korea

[21] Appl. No.: 950,035

[22] Filed: Oct. 14, 1997

[30] Foreign Application Priority Data

Oct. 14, 1996 [KR] Rep. of Korea ...................... 96-45680

[51] Int. Cl.$^6$ ....................................................... H03D 3/24
[52] U.S. Cl. ........................ 375/376; 375/221; 370/249; 371/20.5
[58] Field of Search .................................. 375/221, 213, 375/224, 376; 370/503, 512, 514, 516, 517, 518, 249; 371/20.5

[56] References Cited

U.S. PATENT DOCUMENTS

| | | | |
|---|---|---|---|
| 5,115,451 | 5/1992 | Furlong | 375/221 |
| 5,274,668 | 12/1993 | Marchall | 370/249 |
| 5,600,656 | 2/1997 | Loopback | 371/20.2 |
| 5,778,003 | 3/1995 | Puppa et al. | 370/249 |
| 5,787,114 | 1/1996 | Ramamurthy et al. | 375/221 |

*Primary Examiner*—Jason Chan
*Assistant Examiner*—Congvan Tran
*Attorney, Agent, or Firm*—Bryan Cave LLP

[57] ABSTRACT

A loop back device of a packet communication T1 network includes: a clock generating part which inputs a frame divisional clock and a reference clock, inserts a modulated clock at a predetermined position of the reference clock to generate a main clock and is synchronous to the transformed clock position to generate a system clock for generating and extracting loop back data; a loop back data inserting part which generates the loop back data and is synchronous to the system clock generated from the clock generating part to insert the loop back data into transmission data; a framer and interface part which inputs the transmission data including the loop back data outputted from the loop back data inserting part to transmit the input data to the T1 network and receives is data from the T1 network; a loop back data extracting part which is synchronous to the system clock generated in the clock generating part to extract the loop back data from reception data outputted from the framer and interface part; and a processor which outputs the transmission data to the loop back data inserting part and inputs said loop back data extracted from said loop back data extracting part, to output network testing data.

14 Claims, 5 Drawing Sheets

LOOP BACK DEVICE OF PACKET COMMUNICATION T1 NETWORK

BACKGROUND OF THE INVENTION

1. Field of the Invention

The present invention relates to a packet communication T1 network, and more particularly, to a loop back device of a packet communication T1 network which can transmit and receive a loop back signal between a base station controller and a base transceiver station in a packet communication network using T1 standard.

2. Discussion of Related Art

Generally, a communication system requires a loop back procedure for testing equipment between systems and to transmit information between two positions which are remotely separated from each other. The loop back procedure is accomplished by transmitting a signal to a predetermined destination from a starting point and by then checking the reception of the signal at the starting point through the same path as the transmitting path in a reverse order from the predetermined destination. FIG. 7 is a block diagram illustrating a general loop back procedure. A base transceiver station or a base station controller typically includes a line interface unit (LIU) and inputs data transmitted from an opposite station to its own station(i.e., the base station controller or the base transceiver station) through a network stage. The loop back functions to re-transmit loop back data among data received from the opposite station, to the opposite station.

With such a loop back function, a central switching station can test a repeater or other equipment which is remotely separated therefrom, to thereby reduce the cost of maintenance of the system.

In a mobile communication system, the communication between the base station controller and the base transceiver station is made not by a channel service, but by a packet switching service, and a packet data communication is made by using a T1 or E1 trunk.

The E1 trunk uses national bits of NFA(Non-Frame Alignment), so the loop back function is established. However, the T1 trunk does not have the national bits under the construction of frame and multiframe spec(ITU-T G703, 704, ANSI T1, 102, 107, and 403), so the loop back function is not established.

Therefore, since a loop back signal does not exist in the T1 trunk, the testing of a network in a remote place is not possible. Thereby, the maintenance of the network is difficult and the maintenance cost of the network is accordingly increased.

To solve these problems caused due to the nonexistence of the loop back signal, U.S. Pat. No. 5,600,656 discloses a remote loop back device for testing a repeater. The device is comprised of a means for sensing at least one in channel code sequence which is responsive to an in channel signal and displays an address and a means for performing the loop back signal transmission to the repeater. However, the prior art discloses a device that embodies the loop back function between the repeaters positioned on a T1 telephone circuit, but does not suggest any device that embodies the loop back function between the base transceiver station and the base station controller in a packet communication system.

Accordingly, the base transceiver station and the base station controller, which transmit/receive data in a packet data compunction using T1 standard, should require a novel device having a loop back function, for the purpose of reducing the maintenance cost of the network therebetween.

SUMMARY OF THE INVENTION

Accordingly, the present invention is directed to a loop back device of a packet communication T1 network that substantially obviates one or more of the problems due to limitations and disadvantages of the related art.

An object of the present invention is to provide a loop back device of a packet communication T1 network which can generate a loop back signal between a base station controller and a base transceiver station in a packet data communication using a T1 network.

Another object of the present invention is to provide a loop back device of a packet communication T1 network which can test a network between a base station controller and a base transceiver station in a packet data communication using a T1 network.

Still another object of the present invention is to provide a loop back device of a packet communication T1 network which can test a network between a base station controller and a base transceiver station in a loop back manner, and can execute and ease maintenance of the network and reduce the maintenance cost thereof.

To accomplish these and other objects of the present invention, a loop back device of a packet communication T1 network includes: a clock generating part which inputs a frame divisional clock and a reference clock, inserts a transformed clock at a predetermined position of the reference clock to generate a main clock, and which is synchronous to a position of the transformed clock to thereby generate a system clock which generates and extracts loop back data; a loop back data inserting part which generates the loop back data and is synchronous to the system clock generated from the clock generating part to insert the loop back data into a first transmission data; a framer and interface part which inputs a second transmission data including the loop back data outputted from the loop back data inserting part to transmit the input data to the T1 network and receives data which is transmitted from an opposite station from the T1 network; a loop back data extracting part which is synchronous to the system clock generated in the clock generating part to extract the loop back data from reception data outputted from the framer and interface part; and a processor which controls each part, outputs the first transmission data to the loop back data inserting part according to the main clock, and which does not output the first transmission data in the transformed clock, and inputs the loop back data extracted from the loop back data extracting part, to output network testing data.

Hence, the reference clock used in the synchronization of the packet communication is transformed during a predetermined clock period at a given position of one frame, so packet data is not transmitted and received, and meanwhile, the loop data is inserted into the first transmission data during the transformed period of the reference clock and is then transmitted, so the loop back function is accomplished.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

DETAILED DESCRIPTION OF PREFERRED EMBODIMENT

Reference will now be made in detail to the preferred embodiments of the present invention, examples of which are illustrated in the accompanying drawings.

First, the construction and operational effect of a loop back device of a packet communication T1 network according to the present invention will be discussed in detail with reference to FIGS. 1 to 6.

Figure 1:
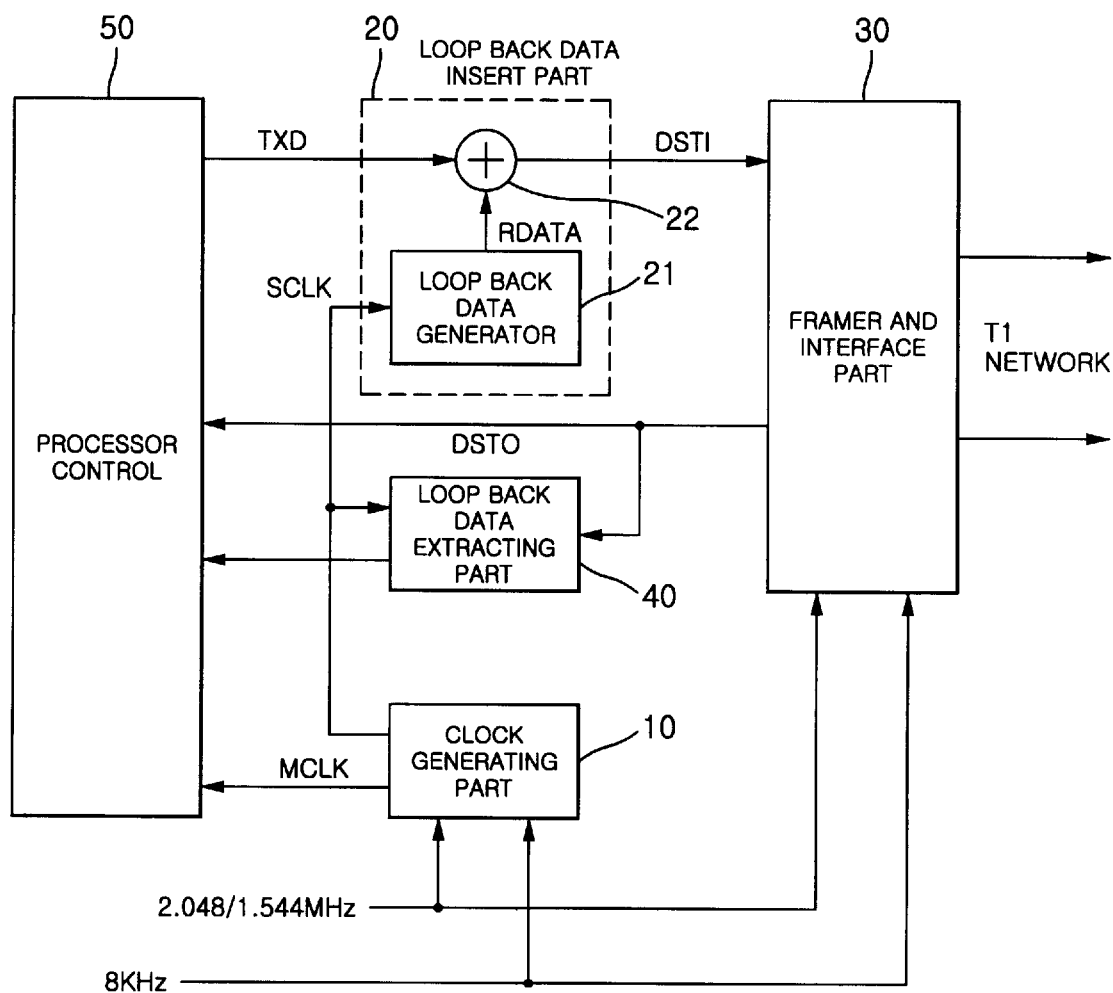
FIG. 1 is a block diagram illustrating the construction of a loop back device of a packet communication T1 network according to the present invention.

FIG. 1 is a block diagram illustrating the construction of a loop back device of a packet communication T1 network according to the present invention. In construction, a clock generating part 10 receives a frame divisional clock (typically, 8 KHz) and a reference clock(2.048 or 1.544 MHz) inputted from the interior or exterior of the base station controller or the base transceiver station. The generating port 10 inserts a modulated clock at a predetermined position of the reference clock to thereby generate a main clock MCLK, which is synchronous to a position of the transformed clock to thereby generate a system clock SCLK which generates and extracts loop back data. For example, the reference clock may be 2.048 or 1.544 MHz, one of which is selected in accordance with an operational velocity of the equipments applied. A loop back data inserting part 20 comprises of a loop back data generator 21 and an adder 22. The loop back data generator 21 generates the loop back data RDATA, and the adder 22 adds first transmission data TXD to the loop back data RDATA, being synchronous to the system clock SCLK generated in the clock generating part 10. A framer and interface part 30 receives second transmission data DSTI which includes the loop back data RDATA outputted from the loop back data inserting part 20 to thereby transmit the input data to the T1 network and receives data which is transmitted from an opposite station from the T1 network. A loop back data extracting part 40 is synchronous to the system clock SCLK generated in the clock generating part 10 to thereby extract the loop back data RDATA from reception data $DST_O$ output from the framer and interface part 30. A processor 50 controls each part, outputs the transmission data TXD to the loop back data inserting part 20, does not output the transmission data TXD in the transformed clock existing at the predetermined position of the main clock MCLK, and receives the loop back data extracted from the loop back data extracting part 40, to thereby output network testing data.

Figure 2:
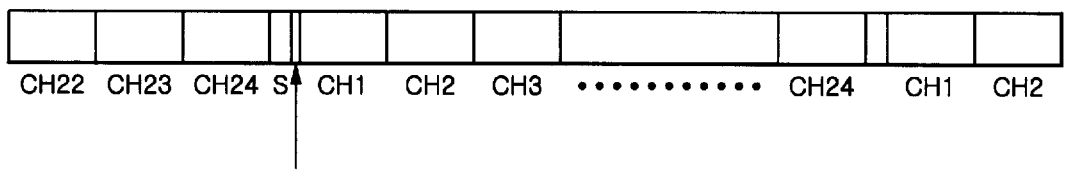
FIG. 2 is a format diagram illustrating the frame of a packet communication T1 trunk embodied in the present invention.
Figure 7:
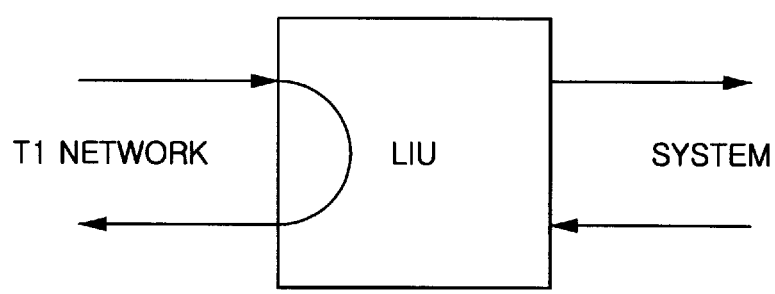
FIG. 7 is a block diagram illustrating a general loop back procedure.

FIG. 2 is a format diagram illustrating the frame of a packet communication T1 trunk embodied in the present invention. One frame of the T1 trunk is comprised of 193 bits (in the case where the reference clock is 1.544 MHz), in which an S bit indicates the starting point of the frame and is placed on a starting position of the frame. The rest of the bits except the S bit, are divided into 24 channels (in the case where the reference clock is 1.544 MHz), into which data is assigned. In the preferred embodiment of the present invention, one channel in the 24 channels is selected, and a predetermined number of bits (for example, 2 bits) in the 8 bits of data of the selected channel are selected, into which the loop back data is assigned. On the other hand, in the case where the reference clock is 2.048 MHz, one frame of the T1 trunk is comprised of 256 bits, the S bit indicates the starting point of the frame and is placed on a starting position of the frame. The rest of the bits excepts the S bit are divided into 32 channels, in which data is assigned. In the same manner as the above, one channel in the 32 channels is selected, and a predetermined number of bits (for example, 2 bits) in the 8 bits of data of the selected channel are selected, in which the loop back data is assigned.

In this case, in order not to transmit/receive the loop back data in a specific bit of the selected channel to which the loop back data is assigned, the reference clock of 2.048 or 1.544 MHz is transformed. In other words, a logic "high" state or a logic "low" state is kept on the specific bit of the selected channel to which the loop back data is assigned. Using the transformed reference clock, the main clock MCLK is generated.

Figure 3:
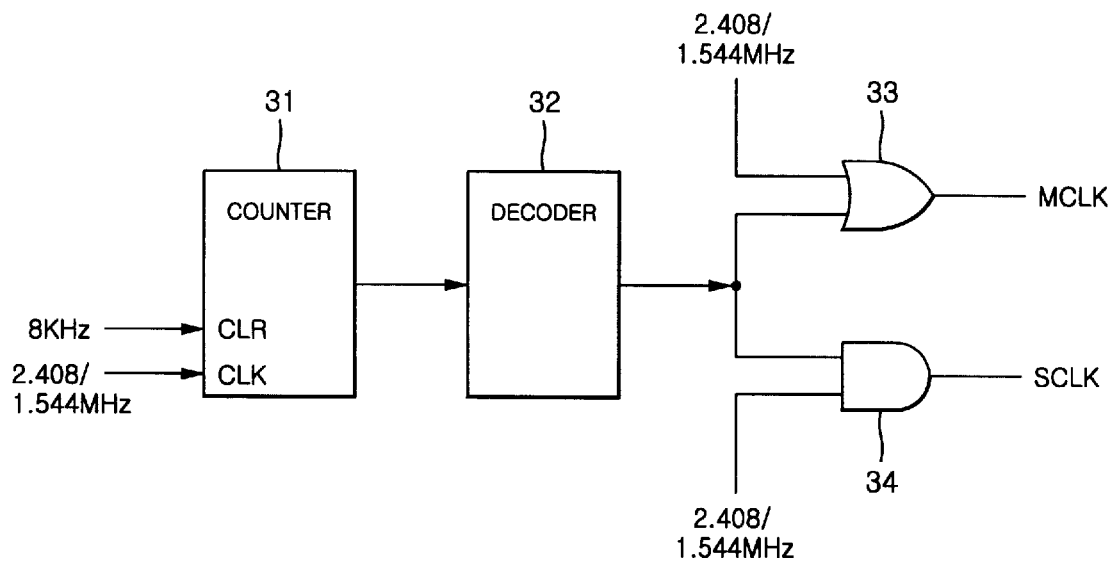
FIG. 3 is a block diagram illustrating an embodiment of a clock generating part of FIG. 1.

FIG. 3 is a block diagram illustrating an embodiment of a clock generating part of FIG. 1. The clock generating part 10 comprises: a counter 31 for synchronizing the reference clock to the frame divisional clock of 8 kHz to count the synchronized clock; a decoder 32 for decoding data output from the counter 31 and which outputs a decoding signal in a predetermined reference clock; an OR gate 33 for performing a logical OR function using the decoding signal outputed from the decoder 32 and the reference clock, and which outputs the main clock MCLK; and an AND gate 34 for performing a logical AND function using the decoding signal output from the decoder 32 and the reference clock and which outputs the system clock SCLK.

The number of bits of the loop back data is preferably 2 bits, but if the number of bits thereof is greater than 2 bits, the transmission speed of the data is reduced, and contrarily, if the number of bits of the loop back data is smaller than the 2 bits, it is difficult to distinguish the different loop back data from the other data. The operation of the clock generating part 10 as constructed above will be discussed, assuming that the loop back data is 2 bits.

For instance, when transmitting the loop back data using 8 and 7 bits of the first channel, the frame divisional clock, as shown in FIG. 6A, is generated, and when the counter 31 counts first and second reference clocks, as shown in FIG. 6C, the decoder 32 decodes the output from the counter 31 to thereby output a data "1" signal. The OR gate 33 logically ORs the data "1" signal output from the decoder 32 and the reference clock to thereby output the ORed result as the main clock MCLK, as shown in FIG. 6E. The decoder 32 is designed to output the data "1" signal by performing the decoding operation when the counter 31 counts first and second reference clocks. Hence, the decoder 32 may be designed to output the data "1" signal in a position of a desired reference clock(for example, first and second reference clocks is in second channel CH2).

Meanwhile, the AND gate 34 logically ANDs the data "1" signal output from the decoder 32 and the reference clock to thereby output the ANDed result as the system clock SCLK, as shown in FIG. 6G. Since the decoder 32 is designed to output the data "1" signal by performing the decoding operation when the counter 31 counts first and second reference clocks and to output a data "0" signal during the time the counter 31 is not counting the first and second reference clocks, the AND gate 34 generates two clocks which are the same as the reference clock, only during the generation of the first and second reference clocks. The system clock SCLK generated from the AND gate 34 is input to the loop back data inserting part 20 and the loop back data extracting part 40, respectively, and is used when the loop back data is inserted and extracted from the reception data $DST_0$.

The main clock MCLK generated from the OR gate 33 is input to the processor 50, and, according to the main clock MCLK, the processor 50 outputs the transmission data TXD to the loop back data inserting part 20. Furthermore, since rising and falling edges are not formed in the transformed clock existing on the predetermined clock of the main clock MCLK, the processor 50 can not output the transmission data TXD. In the embodiment of the clock generating part 10 according to the present invention, various modifications may be made according to application purposes thereof.

Figure 4:
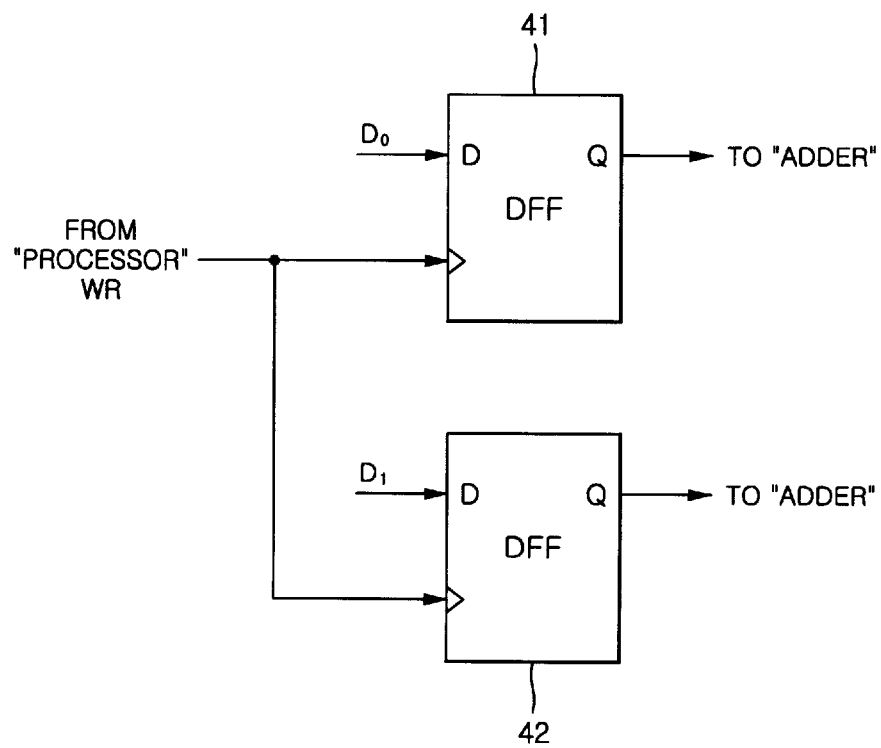
FIG. 4 is a block diagram illustrating an embodiment of a loop back data generating part of FIG. 1.

FIG. 4 is a block diagram illustrating an embodiment of a loop back data generating part of FIG. 1.

The loop back data generator 21 within the loop back data generating part 20 is comprised of first and second D flip-flops 41 and 42, which each output, to the adder 22, first data $D_0$ and second data $D_1$, which are applied to their own D input terminals by a write command WR input from the processor 50. In this case, the loop back data generator 21 is comprised of two D flip-flops to generate 2 bits of loop back data, but may be comprised of three D flip-flops to generate 3 bits of loop back data.

The adder 22 inserts the 2 bits of loop back data RDATA output from the loop back data generator 21 into the transmission data TXD output from the processor 50. As the processor 50 outputs the transmission data TXD to the loop back data inserting part 20 according to the main clock MCLK, the processor 50 cannot output the transmission data TXD in the transformed clock existing on the predetermined position of the main clock MCLK. Accordingly, the adder 22 inserts the loop back data RDATA during the time transmission data TXD is not output. At that time, the adder 22 is synchronous to the system clock SCLK and inserts the loop back data RDATA to the transmission data TXD. The transmission data DSTI including the loop back data, is transmitted to the T1 network through the framer and interface part 30.

Figure 5:
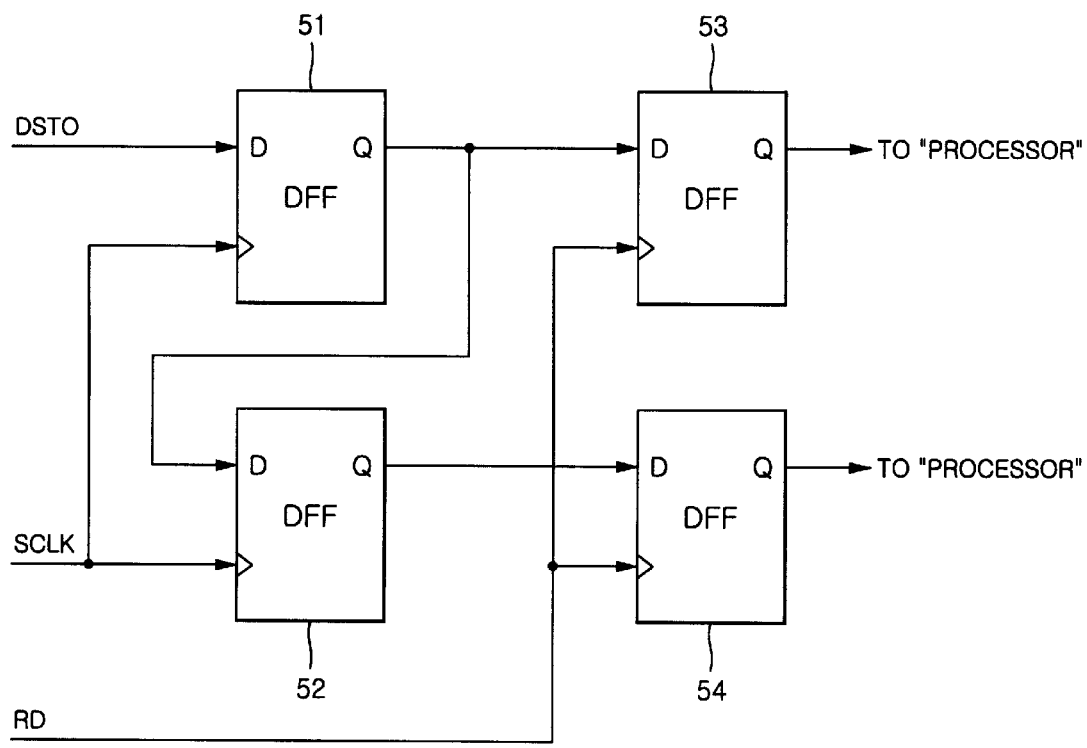
FIG. 5 is a block diagram illustrating an embodiment of a loop back data extracting part of FIG. 1.
Figure 6:
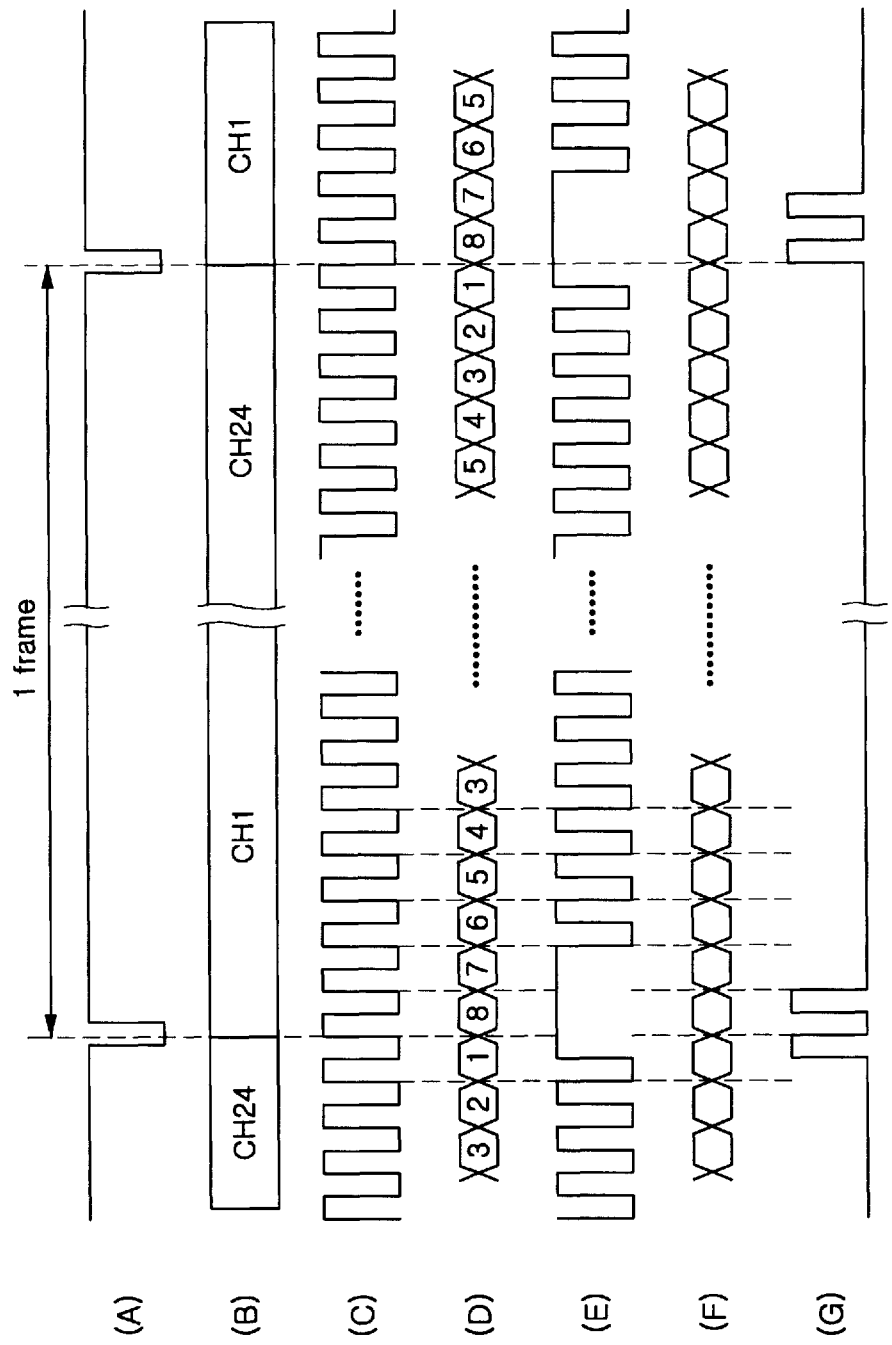
FIG. 6(A to G) are flowcharts illustrating an operational timing of FIG. 1.

FIG. 5 is a block diagram illustrating an embodiment of a loop back data extracting part of FIG. 1.

The loop back data extracting part 40 is comprised of first to fourth D flip-flops 51 to 54, which constitute a serial/parallel shift register. The first D flip-flop 51 inputs serial data from the framer and interface part 30, inputs the system clock SCLK to the clock input terminal thereof, and is synchronous to the time point when the system clock SCLK is generated, as shown in FIG. 6G, (in the preferred embodiment of the present invention, this time point is during the first and second reference clocks after the generation of the frame divisional clock), and thus to outputs the loop back data at the output terminal Q thereof. First loop back data outputs from the first D flip-flop 51 is applied to the input terminals D of the second and third D flip-flops 52 and 53, respectively. Second loop back data in the next system clock SCLK which is synchronous to the system clock SCLK and outputs from the output terminal Q of the first D flip-flop 51 applies the loop back data to the input terminal D of the third D flip-flop 53. Meanwhile, the first loop back data applied to the input terminal D of the second D flip-flop 52 is synchronous to the system clock SCLK and is then output from the output terminal Q of the second D flip-flop 52 to apply the loop back data to the input terminal D of the fourth D flip-flop 54.

After the first and second loop back data are respectively applied to the third and fourth D flip-flops 53 and 54, the processor 50 applies a read command RD to the clock terminals of the third and fourth D flip-flops 53 and 54, so that the first and second loop back data are respectively output from the output terminals Q of the third and fourth D flip-flops 53 and 54. The first and second loop back data output from the third and fourth D flip-flops 53 and 54 are respectively output to the processor 50 to inform the processor that a loop back request has been received from the opposite station.

As mentioned above, a loop back device of a packet communication T1 network according to the present invention can transmit/receive a loop back signal between a base station controller and a base transceiver station in a packet data communication using T1 standard, to thereby test the opposite stations which are remotely positioned. Accordingly, with the loop back device of a packet communication T1 network according to the present invention, ease maintenance of the network is accomplished as well as reduction of the maintenance cost can be ensured.

It will be apparent to those skilled in the art that various modifications and variations can be made in a loop back device of a packet communication T1 network of the present invention without departing from the spirit or scope of the invention. Thus, it is intended that the present invention cover the modifications and variations of this invention provided they come within the scope of the appended claims and their equivalents.

What is claimed is:

1. A loop back device of a packet communication T1 network, said device comprising:

a clock generating part for receiving a frame divisional clock and a reference clock, for inserting a transformed clock at a predetermined position of said reference clock to thereby generate a main clock, and being synchronous to a position of the transformed clock to thereby generate a system clock which generates and extracts loop back data;

a loop back data inserting part for generating said loop back data and being synchronous to said system clock generated from said clock generating part to thereby insert said loop back data into first transmission data;

a framer and interface part for receiving second transmission data including said loop back data output from said loop back data inserting part to transmit the input data to the T1 network and for receiving data which is transmitted from an opposite station from the T1 network;

a loop back data extracting part being synchronous to said system clock generated in said clock generating part to extract said loop back data from reception data output from said framer and interface part; and a processor for outputting said first transmission data to said loop back data inserting part and for receiving said loop back data extracted from said loop back data extracting part, to thereby output network testing data.

2. The loop back device of a packet communication T1 network as claimed in claim 1, wherein said main clock is generated, as said reference clock is kept at a logic "high" or "low" state during one or more clock time periods at a predetermined position of a frame and is transformed, and said system clock is generated, as a predetermined number of pulses are generated during which said main clock is kept at a logic "high" or "low" state.

3. The loop back device of a packet communication T1 network as claimed in claim 1, wherein said clock generating part comprises:

a counter for synchronizing said reference clock to said frame divisional clock, and to count the synchronized clock;

a decoder for decoding output data from said counter, wherein said decoder outputs a decoding signal in a predetermined reference clock;

an OR gate, said OR gate performing a logical OR using said decoding signal output from said decoder and said reference clock to thereby output said main clock; and an AND gate, said AND gate performing a logical AND using said decoding signal output from said decoder and said reference clock to thereby output said system clock.

4. The loop back device of a packet communication T1 network as claimed in claim 1, wherein said loop back data inserting part comprises a loop back data generator and an adder.

5. The loop back device of a packet communication T1 network as claimed in claim 1, wherein said loop back data extracting part is comprised of a serial/parallel shift register.

6. The loop back device of a packet communication T1 network as claimed in claim 4, wherein said loop back data generator comprises a number of D flip-flops wherein said number of D Flip Flops corresponds to the number of bits of said loop back data.

7. The loop back device of a packet communication T1 network as claimed in claim 4, wherein said adder is synchronous to said system clock to thereby add said loop back data to said first transmission data.

8. The loop back device of a packet communication T1 network as claimed in claim 5, wherein said serial/parallel shift register comprises: a first flip-flop for receiving serial data from said framer and interface part and being synchronous to said system clock, said first flip-flop producing a first output data signal; a second flip-flop for receiving the first output data signal from said first flip-flop and being synchronous to said system clock, said second flip-flop producing a second output data signal; a third flip-flop for receiving said first output data signal from said first flip-flop, said third flip-flop outputting a third output data signal in response to a control signal output from said processor; and a fourth flip-flop for receiving the second output data signal from said second flip-flop, said fourth flip-flop outputting a fourth output data signal in response to said control signal output from said processor.

9. A loop back device of a packet communication T1 network, said device comprising:

a clock generating part for inserting a transformed clock at a predetermined position of a reference clock to generate a main clock and for generating a system clock only at a position of the transformed clock;

a loop back data inserting part for generating loop back data and for inserting said loop back data into first transmission data during the time said system clock is generated;

a framer and interface part for inputting second transmission data including said loop back data output from said loop back data inserting part to transmit the input data to the T1 network and for receiving data from the T1 network;

a loop back data extracting part, said loop back data extracting part being synchronous to said system clock to extract said loop back data from reception data output from said framer and interface part; and a processor for controlling each of said parts, outputting said first transmission data to said loop back data inserting part according to said main clock, and receiving said loop back data extracted from said loop back data extracting part, to thereby output network testing data.

10. The loop back device of a packet communication T1 network as claimed in claim 9, wherein said main clock is generated, as said reference clock is kept at a logic "high" or "low" state during one or more clock time period at a predetermined position of a frame and is transformed, and said system clock is generated, as a predetermined number of pulses are generated during said main clock is kept at a logic "high" or "low" state.

11. A loop back device of a packet communication T1 network, said device comprising: a clock generating part for generating a main clock which transmits/receives data to and from the T1 network by transforming a reference clock and for generating a system clock which generates and extracts loop back data;

a loop back data inserting part for generating said loop back data and being synchronous to said system clock generated from said clock generating part to insert said loop back data into first transmission data;

a framer and interface part for transmitting second transmission data output from said loop back data inserting part to the T1 network and for receiving data from the T1 network;

a loop back data extracting part, said loop back data extracting part being synchronous to said system clock to extract said loop back data from reception data output from said framer and interface part; and a processor for outputting said first transmission data to said loop back data inserting part according to said main clock, and for receiving said loop back data extracted from said loop back data extracting part, to thereby output network testing data.

12. The loop back device of a packet communication T1 network as claimed in claim 11, wherein said clock generating part generates said main clock, after a frame divisional clock for dividing a frame is generated, as said reference clock is kept at a logic "high" or "low" state during one or more clock time periods at a predetermined position of said frame divisional clock, and generates said system clock, as a predetermined number of pulses of said reference clock are generated during said main clock is kept at a logic "high" or "low" state.

13. The loop back device of a packet communication T1 network as claimed in claim 11, wherein said loop back data inserting part comprises a loop back data generator for generating said loop back data, said loop back data generator being synchronous to said system clock, and a loop back data inserter for inserting said loop back data into said first transmission data, said loop back data inserter being synchronous to said system clock.

14. The loop back device of a packet communication T1 network as claimed in claim 11, wherein said loop back data extracting part extracts said loop back data inserted into a predetermined position of said reception data output from said framer and interface part, said loop back data extracting part being synchronous to said system clock.

* * * * *